United States Patent [19]

Wixon

[11] Patent Number: 4,783,991

[45] Date of Patent: Nov. 15, 1988

[54] IGNITION AND COMBUSTION ENGINE PERFORMANCE MONITOR

[76] Inventor: Glenn H. Wixon, 10645 Art St., Sunland, Calif. 91040

[21] Appl. No.: 622,576

[22] Filed: Jun. 20, 1984

[51] Int. Cl.$^4$ .................................... G01M 15/00

[52] U.S. Cl. .................................... 73/117.3; 324/384; 324/390; 324/399

[58] Field of Search ............... 73/116, 117.3; 324/378, 324/380, 388, 390, 398, 399, 384

[56] References Cited

U.S. PATENT DOCUMENTS 3,415,114 12/1968 Crampton et al. ............ 324/402 X
3,474,667 10/1969 Fuchs ............................ 324/384
3,986,009 10/1976 Fastaia .......................... 73/116 X
4,291,383 9/1981 Tedeschi et al. .............. 324/384 X
4,401,948 8/1983 Miura et al. .................. 324/390 X
4,449,100 5/1984 Johnson et al. ............... 324/390 X

*Primary Examiner*—Jerry W. Myracle

[57] ABSTRACT

A semiautomated diagnostic apparatus primarily used with ignition systems on internal combustion engines is novel in that every firing is examined for peak breakdown voltage level in a synchronized sequential manner to create a display of abnormalities and sequence number identification. Normal conditions can also be displayed in sequence when desired. A variable input permits examining relative peak voltages for further user analysis. An acoustic alert is provided as is an RPM indication and novel realtime indication of spark advance angle. The system operates at any engine speed.

3 Claims, 5 Drawing Sheets

IGNITION AND COMBUSTION ENGINE PERFORMANCE MONITOR

FIELD OF THE INVENTION

This invention relates to the diagnosis of spark ignition systems; more particularly as related to the sequential operation of an internal combustion engine and the specific location of faults.

PRIOR ART

The most successful prior art is the ignition analyzer. This device relies on a synchronized oscilloscope pattern presentation requiring operator knowledge. It is incapable of detecting one out of many faults due to persistence of vision and extreme attention required. Spark advance angle detection is done with an open hood and a strobe light under unloaded engine conditions. Prior patents of Johnson and Miura do not isolate problems to a definite sparkplug nor do they address the problem of advance angle. Johnson determines coil magnetic condition and is not a continuous operating system for all ranges. Miura detects weakness in insulation and predicts peak voltages without detecting the situation for misfired plugs. Fastaia relies on mechanical effects and advance angle is stored utilizing a timing light necessitating an open hood.

SUMMARY OF THE INVENTION

This invention recognizes that the peak voltage reached at the moment of sparkplug breakdown ionizing level is most useful for the detection of sparking faults. The novelty is in the immediate automated processing of this voltage by highspeed comparator detection and a synchronized counter and display to keep track of the plug under test. Manual adjustment for sensing level provides relative subjective judgments. Misfiring and open lead conditions are light and and acoustic alert signals. A remote readout of spark advance angle is continuously available and is provided by a novel method which increases its accuracy by the number of plugs in the system. RPM reading is provided and its novelty is in its association with the other unique components of the invention to form a complete monitoring package as is an acoustic alert signal in this combination.

DESCRIPTION OF A PRECISE EMBODIMENT

Figure 1:
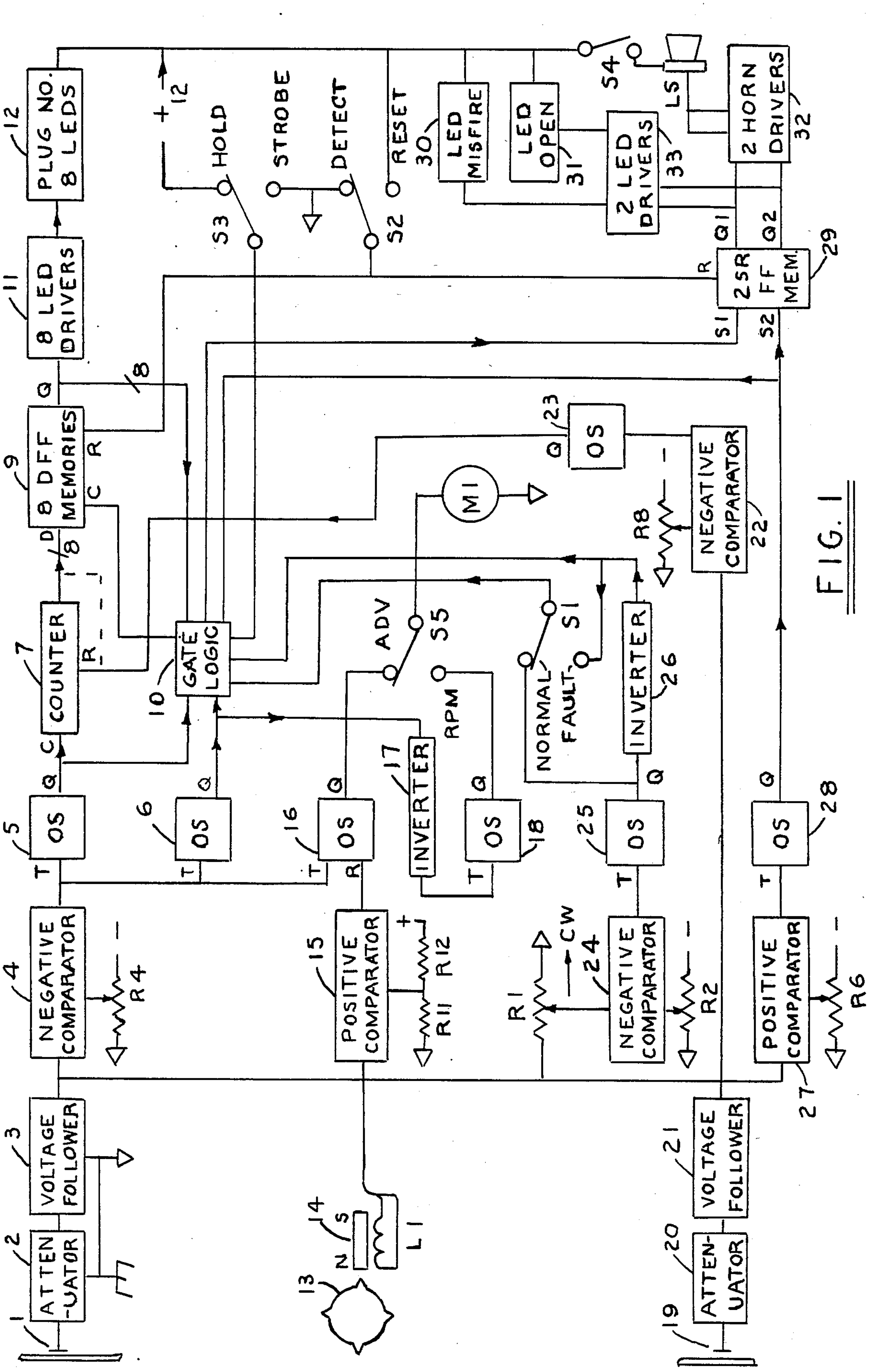
FIG. 1 is a block diagram of the complete system without power sources.

The block diagram of FIG. 1 provides an overview of the entire engine analyzer system: remote signal pickups, decision logic, fault and location displays, advance timing angle, RPM indication, and acoustic alert.

The signal pickups comprise three remote engine mounted sensor means as follows:

Means for producing accurately scaled ignition signals from the high voltage ignition source. Said means comprise items 1, 2, and 3. The capacitive clamp 1 is coupled to the ignition source of high voltage or distributor input. Nondistorting attenuator 2 and active FET input voltage follower 3 provide capability to drive a connecting line without distortion of the original signal.

Means for producing signals representing crankshaft top dead center piston positions comprise sensor 13, 14, L1 and comparator 15. A four-lobed ferrous material disc 13 has its lobes aligned with reference to the crankshaft's top dead center piston positions. The combination of a permanent magnet overwound with an inductor is secured at a TDC reference point. This signals the passage of the TDC lobe points as they transit. The mounting arrangement is such as to detect the ferrous lobes when they disturb the magnetic field of 14. A bipolar four-volt peak to peak signal is generated at the TDC point. The exact point is fixed by the placement of magnet 14 and polarity of the connecting pair of wires. An alternative ferrous material arrangement is to fasten the material by epoxy to the harmonic balancer periphery at the TDC points. The disc arrangement is attached to the front of the harmonic balancer. This method is most suitable for retrofit installation in existing engines. A factory installation could be made at any place where a TDC signal may be initiated by a crankshaft, camshaft, or distributor action. The inductive method described is rugged and cost effective. Other methods such as Wiegand wires, optoelectronic, proximity, or Hall effect could also be used. These methods are all well known. The detection of all TDC points is uniquely integrated with the advancement indication described later.

Means for providing reference sparkplug signals comprise items 19, 20, and 21. These items are identical to that of 1, 2, and 3 except that the pickup at 19 is coupled to a reference sparkplug, usually number one.

The decision logic consists of:

Individual comparator means responsive to said scaled ignition signals comprise every ignition event comparator 4, normal comparator 24, and abnormal comparator 27. A complementary abnormal signal from 4 is provided by inverter 26. The comparators all derive their signals from voltage follower 3.

Reference comparator means responsive to every ignition event of said reference sparkplug signals for producing comparator output signals comprise comparator 22 connected to voltage follower 21. The comparator reference at R8 is set to process all reference sparkplug ignition events whether normal firing, open lead, or a shorted sparkplug.

The display of ignition faults consists of:

Means responsive to said comparator signals for indicating abnormal ignition operation comprise items 5, 6, 25, 26, 10, 28, 29, 30, 31, 32, 33, and LS. Monostable multivibrators 5, 6, 25, and 28 are one shot OS. Inverter 26 is necessary for logic 10 use for fault detection. The dual flipflop memory 29 is arranged for set reset operation so that it will log a first input and hold the result for as long as desired. Two sources of capture are provided, one directly from OS 28 to immediately set Q2 and through the drivers 33 and 32 to light and activate Open LED lamp 31 and sound a horn at LS. The second source from inverter 26 is processed in the gate logic by spark event sampling to output a capture signal for Q1 at 29 and then through drivers 32 and 33 to light a Misfire LED and sound a horn at LS. Horn alert may be disabled as shown by S4.

Figure 2:
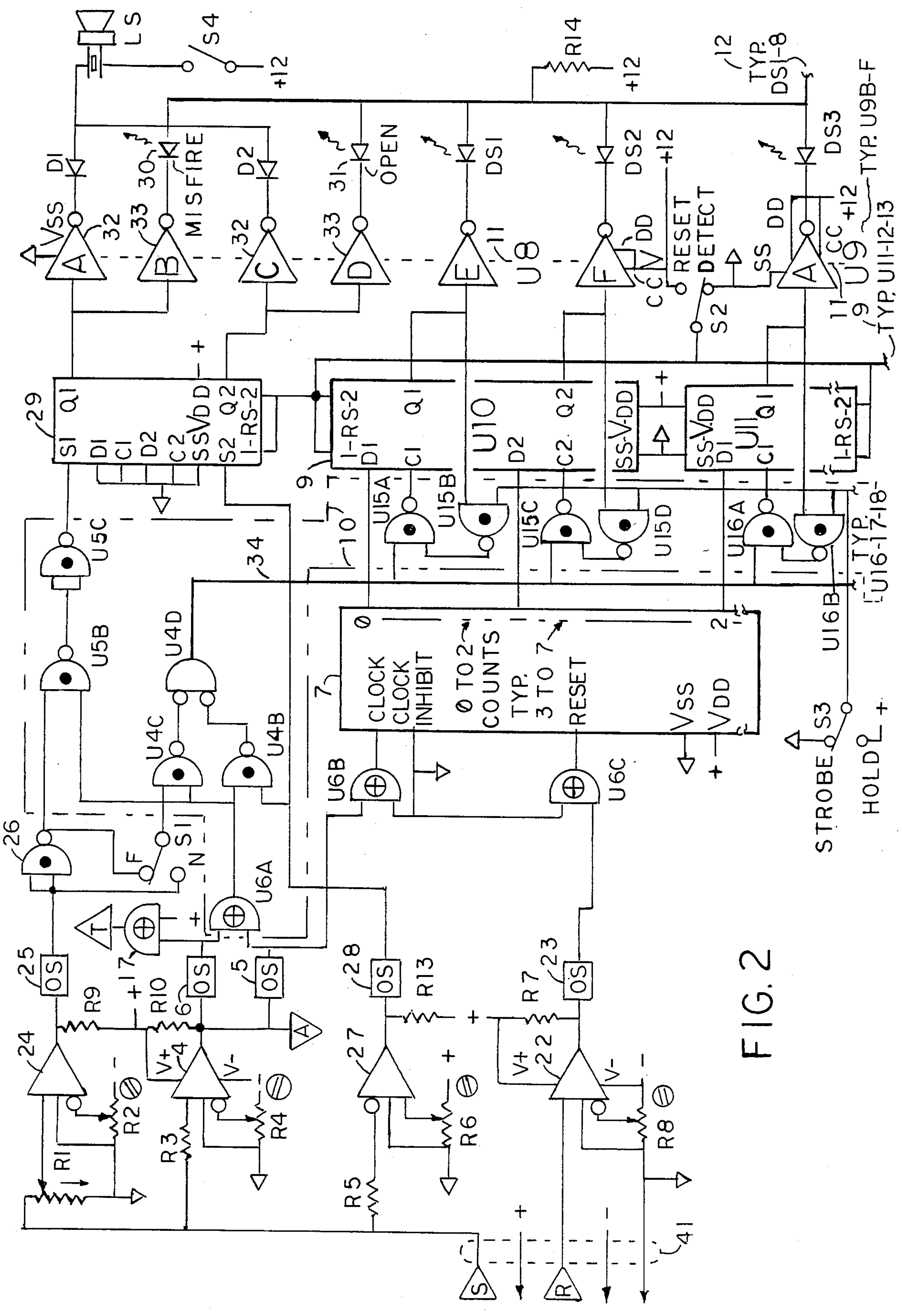
FIG. 2 is a schematic diagram of decision elements, synchronous counter, display logic, and acoustic alert.

The ignition location displays consist of:

Means for indicating individual sparkplug malfunctions comprise items 5, 6, 7, 10, 9, 11, 12, 19, 20, 21, 22, 23, and S1 at Fault. OS 5 has a pulse of 1.2 mS and OS 6 has a 1.5 mS pulse. These are exclusively ORed in logic 10 to create a 1.1 mS delayed sampling event pulse of 0.4 mS. OS 5 also immediately sets the counter 7 to signal the ignition event count. This count is immediately transferred to the D input of 9 via the /8 connecting lines but does not set the Q output until a clock is received. This clock is the delayed event pulse coming out of logic 10 on eight separate lines. The clock is logically detected as will be seen in detail when FIG. 2 is described. The purpose of the logic arrangement at 10, FIG. 1, is to output a delayed sampling event pulse for memory clocking on option from S3 Hold or Strobe, and S1 at Normal or Fault. The Normal position at S1 receives a pulse from OS 25 whenever comparator 24 input is above a predetermined floor level. The logic 10 then outputs a delayed event pulse for every signal that is above the floor. This changes to only output a pulse for all events that are below the floor, a Misfire condition when Fault selected at S1. These pulses then display on the LEDs by the path to the LED drivers at 11 and LEDs at 12. If S3 is on Strobe, the display is from event to event and if on Hold the event pulse is interlocked through gate logic 10 so that immediately on setting the memory further clocks to that memory are inhibited. The inhibit feature enables capturing the first ocurring Fault event and locking out further action on the captured location display. The advantage of the arrangement is that no attention need by given to the location display until the user desires. At the same time, the system continues to sense locations for other fault locations so that all occurring faults will be detected whether they are continuous or momentary. The reason that only one specific memory latches the data is that, while all counts are connected to the D inputs, only one specific count will be high at any one time. The common event clock C from 10 captures the specific count. A parallel path from OS 28 to logic 10 indicates an Open lead location and indicates in a similar manner. This sensing is continuous and is not selected. The logic details of 10 are shown in FIG. 2 schematic interconnections. Arrow S of FIG. 2 is the scaled all event signal originating from U1 in FIG. 4 arrow S via cable 41. This signal is the line originating from 3 in FIG. 1.

The synchronization of the counter 7 is insured by the reset signal from voltage follower 21 to comparator 22 which has R8 adjusted to process signals of shorted plugs, normal or open in level. Comparator 22, connecting to OS 23, then provides a precise resetting pulse to counter 7 as a zero count which becomes count 1 of a sequence. This arrangement has the ability to automatically configure the counter for whatever number of events are in a specific engine up to the maximum provided in the analyzer. The analyzer could easily be arranged for up to twenty-eight cylinders. The precise embodiment configures for one to eight ignition events. An alternate dotted feedback path at counter 7 would reset the counter upon reaching a count in excess of the sequence count for a particular engine. Then this arrangement only needs an initial synchronizing pulse. The feedback requires configuration for a specific type engine. The continuous reset has been proven reliable and provided a reset even with shorted sparkplugs. It is impossible to short out the high frequency components of an ignition spark given the copper or resistor type wiring used in ignition systems. The comparator easily detects these high frequency components as well as the normal peaks by its preset adjustment.

A further description on just how the comparators discriminate for an intended function follows: Comparator 4 is adjusted by precision reference preset negative adjustment at R4 to provide a negative going signal at T inputs of OS 5, OS 6, and OS 16 when any ignition event signal is present, whether shorted sparkplugs, normal firing, or open circuits. Comparator 24 is adjusted by a combination of R2 set for detection of a shorted sparkplug level which represents its signal level and attenuator R1 fully CCW or zero attenuation. R1 dial is then calibrated in peak kilovolts as attenuation is introduced. Comparator 27 is preset at R6 for the most prominent peaks of a nonionizing lead off or open circuit condition. This is represented by the positive peak at 51 in FIG. 5. False signals and pulse skewing problems are eliminated by the combination of nonretriggerable one shots and comparator acceptance floors.

The calibrated dial at R1, FIG. 1, together with the displays at 12 provide a means to determine the acceptance level for Fault detection. Switch S2 at Detect, S3 at Strobe, and S1 to N, Normal, permit the user to adjust R1 for the exact peak voltage at spark breakdown. This voltage is related to cylinder compression: more compression, higher voltage. The user notes where each individual LED of 12 activates and the dial voltage provides an indication of relative voltage and compression. Unattended Fault detection is then obtained by adjusting R1 to approximately twenty percent less attenuation, less peak volts, than the exact trip point. Then S1 is switched to F, Fault, for unattended fault indications. This easily handles the extremes of normal driving. The R1 acceptance is determined by the user and by means of a single control.

In FIG. 1, means for indicating the spark advance angle for every ignition event comprise the output of comparator 4 to set the T input to OS 16, and to terminate the pulse with the reset input coming in from comparator 15 and TDC signals from 13, 14, and L1. A positive 1.2-volt comparison, preset by R11, R12, provides a well defined negative result pulse at R for OS 16 which functions as a set reset flipflop. The output of OS 16, selected with S5 at ADV, is averaged by meter M1. The component period for OS 16 is RC designed for about 16 mS. This duration only need be longer than any expected advance time as it will actually be terminated by the TDC reset pulses at OS 16 so that OS 16 functions as a set reset flipflop. The M1 indication, which is automatically compensated for by the variable off and on times, is not affected by changes in engine speed. The arrangement is also independent of engine rotation direction as all references are terminated by the TDC point which is the same for any engine rotational direction.

An additional feature is the RPM indication at M1. The arrangement is similar to advance but the pulse duration is fixed. Triggering pulses are provided by the event signal at OS 6 which passes through inverter 17 to provide the necessary low trigger to OS 18. When S5 is at RPM, M1 averages the Q output signals from OS 18.

Arrow S, FIG. 2, interconnections are clearly shown by the schematic. R1 is a 4 k ohm potentiometer. R3 and R5 are 10 k ohm isolating resistors. R2, R4, R6, R8 are 10 k ohm twenty-turn screwdriver adjusted, noted by slotted circles, precision references derived from their respective regulated supplies. R9, R10, R13, and R7 are 1.5 k ohm sourcing resistors for the LM319 comparators at 24, 4, 27, and 22. These comparators are sufficiently fast to capture the peak ignition signals appearing on arrow S and arrow R. The nanosecond positive to ground pulses from comparators 24, 4, 27, and 22 trigger one shots 25, 6, 5, 28, and 23. OS 25 has a time constant of 2.3 mS; OS 6, 1.5 mS; OS 5, 1.1 mS; OS 28, 2.0 mS; and OS 23, 2.1 mS. These time relationships are not critical and are always less than the shortest time between spark events. This is 3 mS for an eight-cylinder engine at 5000 RPM. Time constants are component controlled by the formula T equals 1.1RC. The components are not shown in FIG. 2. They are connected in the same way as C2 R20 for OS 18 of FIG. 3. FIG. 2, U6A output, is the delayed event pulse which is always present for any ignition event regardless of spark situation. The inverter at 17 provides an high to low pulse of 1.5 mS at arrow T which is the tachometer input for RMP sensing to OS 18 in FIG. 3.

The FIG. 2 Fault and Normal display is accomplished by the Bus 34 signal from U4D, the U15 to U18 gate portions of item 10, item 9 comprising U10 to U13, item 11 comprising U8E and F and U9A to F, and item 12 comprising DS1 to DS8 which are LED lamps. The Bus 34 signal originates from two sources at NOR gate U4D. A first source is from U4B, the open lead signal from OS 28, coincidence detected with the delayed sampling signal from U6A. The second source is from U4C. U4C is either the Normal or Fault input from OS 25 or inverter 26 as selected at S1. The coincidence at U4C with the delayed sampling signal from U6A again is detected to control Bus 34. This coincidence is required to detect the difference between a nonevent and an ignition event for location as well as fault display at 29, 32, and 33. The Fault coincidence occurs through 26 and U6A at U5B inverted by U5C to set Q1 at 29. The Q1 output connects to driver 33 which illuminates Misfire LED 30. Q1 also connects to driver 32 which connects to D1 and to LS to sound an alert if S4 is closed. Added details for the Open lead detection previously described are the driver 32 and diode D2 so that either Misfire or Open sounds at LS. A Mallory Sonalert SG628H pulsating tone was chosen for LS. The purpose of R14 is to limit the LED currents operating from the 12-volt bus which was needed to supply sufficient audio power from LS.

Mechanization of the interlock from memories at 11 is accomplished by the Q feedback at 9 being activated by the switch S3 to Hold. The high on all S3 connected gates disables further Q inputs if Q has been previously set. This maintains a high on all clock inputs to memory 9 for those that were set. The opposite position of S3 to Strobe disables the feedback and allows all Fault or Normal sampling pulses to capture the count when the sampling pulse returns to low. The gate action provides the low to high transition necessary to capture the count which is always present at a particular memory data FF. The S3 Strobe position displays the location of the selected event at S1 from event to event. The S1 Normal position provides a sequential display at the panel.

The one shots are all LM555 types. The additional component types used in FIG. 2 were: U4, U5, U15 through 16 CA4011 Quad Dual Input NAND; U6 CA4030 Quad exclusive OR; item 29 and U10 through U13 are CA4013 Dual D flipflops; U10 through U13 are location memories of item 9; U8A,C comprise item 32; U8B,D comprise item 33; U8E,F and U9A-F comprise item 11, U8 and U9 are CA4009 Hex Buffer Converters; and item 7 is a CA4017 Decade Counter. U4, U5, U15–U18 in the outline for 10 comprise the gate logic. These packages are all readily available cost effective CMOS types. All of the items in FIG. 2 and FIG. 3 with the exception of 13, 14, L1, and cable 40 are assembled in a local analyzer unit.

Power for the active sensors and FIG. 2 items is from the plus and minus signs and the small open arrow. The plus sign is the positive 7-volt regulated bus and the minus sign is the minus 7-volt regulated bus originating at 38 and 39 of FIG. 3. Cable 41 in FIG. 2 supplies power and receives signals from the engine mounted sensors of FIG. 4.

Figure 3:
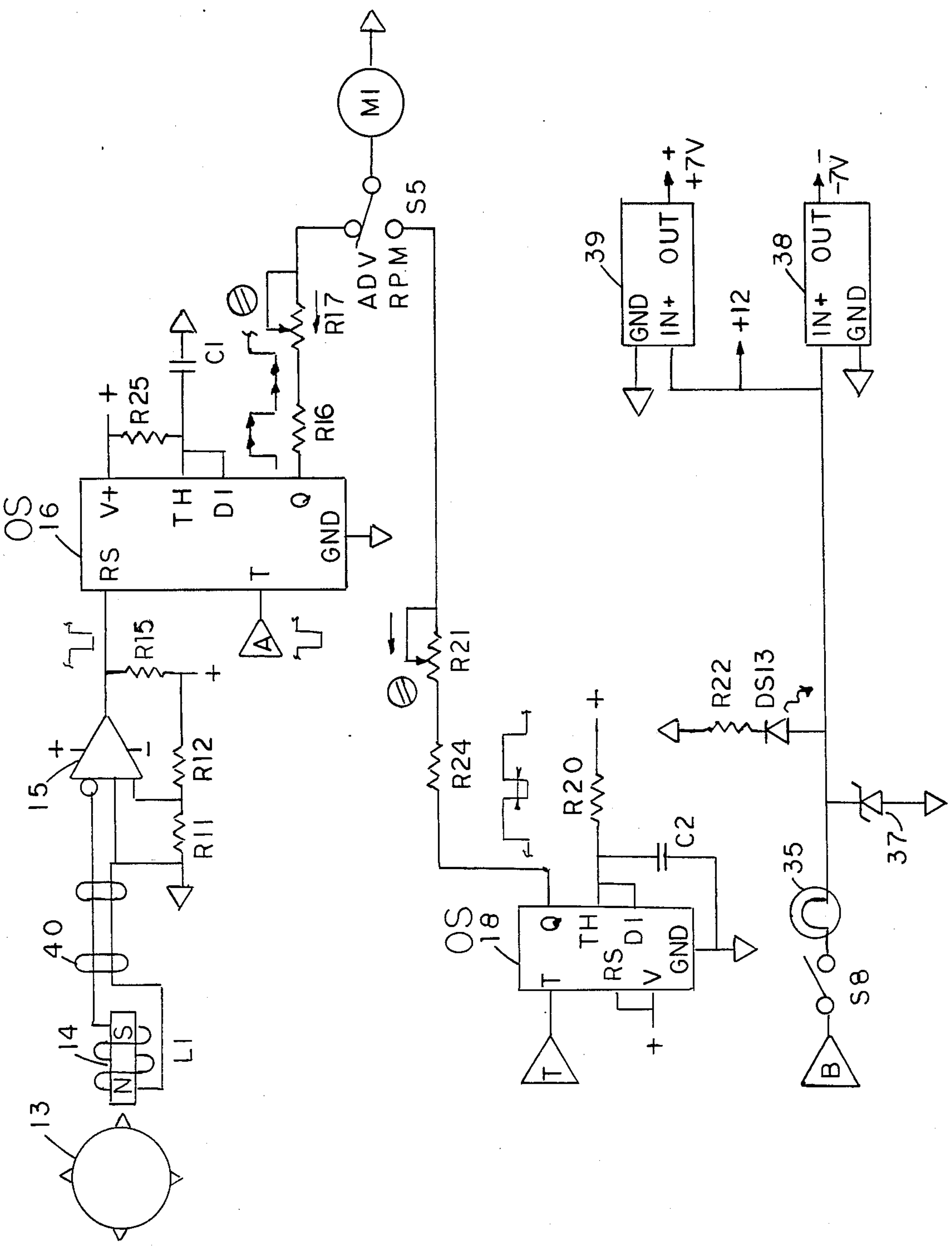
FIG. 3 is a schematic diagram of the Advance angle circuits, RPM detection, and power circuitry.

The advance circuit in FIG. 3 initiates a pulse at OS 16 upon detecting an input trigger which originates from arrow A, FIG. 2, at comparator 4. FIG. 3, OS 16 nonreset duration is determined by C1 R25 combination. The actual pulse duration is controlled by the reset pulses. This pulse originates at the TDC pickup of 13, 14 and L1 via cable 40 to control the comparator detector 15 sensing positive levels. R15 is 1.5 1 k ohms to source the LM319 open collector. OS 16 Q out then has a variable duration pulse and off times having a peak of 7 volts. The average level is indicated by the DC 1 mA meter movement at M1 when S5 is at ADV. The resistors R16 and R17 provide a fixed and a variable calibrating resistor to set the full scale reading. M1 then becomes a voltmeter which is calibrated here for 40 degrees full scale indication. An eight-cylinder four-cycle engine then has the calibration adjusted for a full scale voltmeter reading of 7 volts multiplied by 40 over 90 or 3.11 volts. A four-cylinder engine would be 7 by 40 over 180 or 1.55 volts. The scale calibrating resistors need to be selected for whatever engine type is monitored. The actual voltage calibration will be slightly different due to voltage being a little less than 7. This is easily compensated for by adjustment at R17. The waveform at Q out shows by the arrows the variable duration points. The indication is linear.

A unique feature of the advance indication is that it senses for every spark event and is therefore more accurate than any system which senses only for one event every other revolution. This type of indication has application as a feedback element of spark angle for servo uses. The four-lobed disc at 13 provides universal TDC eight-cylinder one, two or four cylinders or sensing because the lobes are not acted on until an ignition event initiates their detection. Once the OS is reset it remains reset no matter how many resets are present until the spark event activates. Lobed disc 13 needs only the number of points equal to half the number of cylinders in the engine of maximum size to be monitored for four-cycle types. Disc 13 requires 120-degree three-lobed spacing for three or six cylinder types and 60-degree spacing for twelve cylinder types. The requirement is for a TDC pulse to be received at each TDC position after an advance initiated ignition signal is received. Two-cycle types require a lobe point for each cylinder. This advance arrangement gives an accurate continuous remote indication eliminating the need for external strobe lamps commonly used.

For RPM, OS 18 RC combination at R20 C2 was chosen to give 2.9 mS pulses for an indication of 5000 RMP for an eight-cylinder four-cycle engine which has a 3 mS spark to spark time. The input to OS 18 from arrow T originates at 17 in FIG. 2. The switch S5 in FIG. 3 at RMP connects to the Q output of OS 18 through calibrating resistors R24 and R21. This calibration is for a voltmeter of 7 multiplied by 2.9 mS over 3 mS or 6.76 volts for full scale with minor variations accommodated by calibration adjustment at R21. The waveform shows arrows where the variable RPM is actually sensed. The indication is linear. The choice of 2.9 mS allows only a limited meter movement beyond full scale.

The physical view of the unit has not been shown as the circuitry is the key item. The actual appearance will depend on ergonomic conditions depending on components selected. The main controlling features are the meter M1 calibrated dial at R1, sequence lights DS1 through DS8, and horn LS. The specific embodiment and proof of performance package was a handwired unit fitting into a 2.5 inch by 5 inch by 6.6 inch box. The 5 inch by 6.5 inch panel mounted M1, R1, all switches, LS, LEDs 30 and 31 and DS1 through DS8. The DS1 through DS8 were arranged in a parallelogram with four lights on the top row and four on the bottom staggered a half position. This gives an easily followed sequence of top row left to right and bottom row right to left and around again providing an operator user relationship. Each individual light was then panel labelled with the sequence for the car under test.

Dedicated systems of lesser ignition sequence may have components deleted at DS1–DS8, U11–U13, U16–U18, and U9. Self-contained batteries may be used as power requirements are low. Batteries are most useful for a mechanic's use when working on different cars as they eliminate the need for a power connection. Regulators are still needed at 38 and 39, FIG. 3, to eliminate the effects of battery aging. However, 38 could be replaced by a simple regulator if a separate battery is used, eliminating the need for a DC to DC converter. Twelve-volt smoke detector alkaline batteries have been tested and they provided long life. Because a car or aircraft user does not want to be bothered with battery changing, the arrangement shown in FIG. 3 is most desired. The power source is the ignition key switch 45 of FIG. 4 originating at arrow B. FIG. 3 arrow B connects to S8 the On and Off switch on the analyzer panel. Ballast lamp 35 is behind the panel and acts as a fuse and ballast and is a number 44 pilot lamp. 37 is a 15-volt zener clamp and DS 13 is a LED indicator lamp for power on the R22 the current limiting resistor of 1.5 k ohms. Regulators at 38 and 39 are standard precision units with 38 having the additional feature of DC to DC conversion which is necessary for detection of negative signals. Plus minus indications become the 7-volt plus and minus busses for all integrated circuits.

Figure 4:
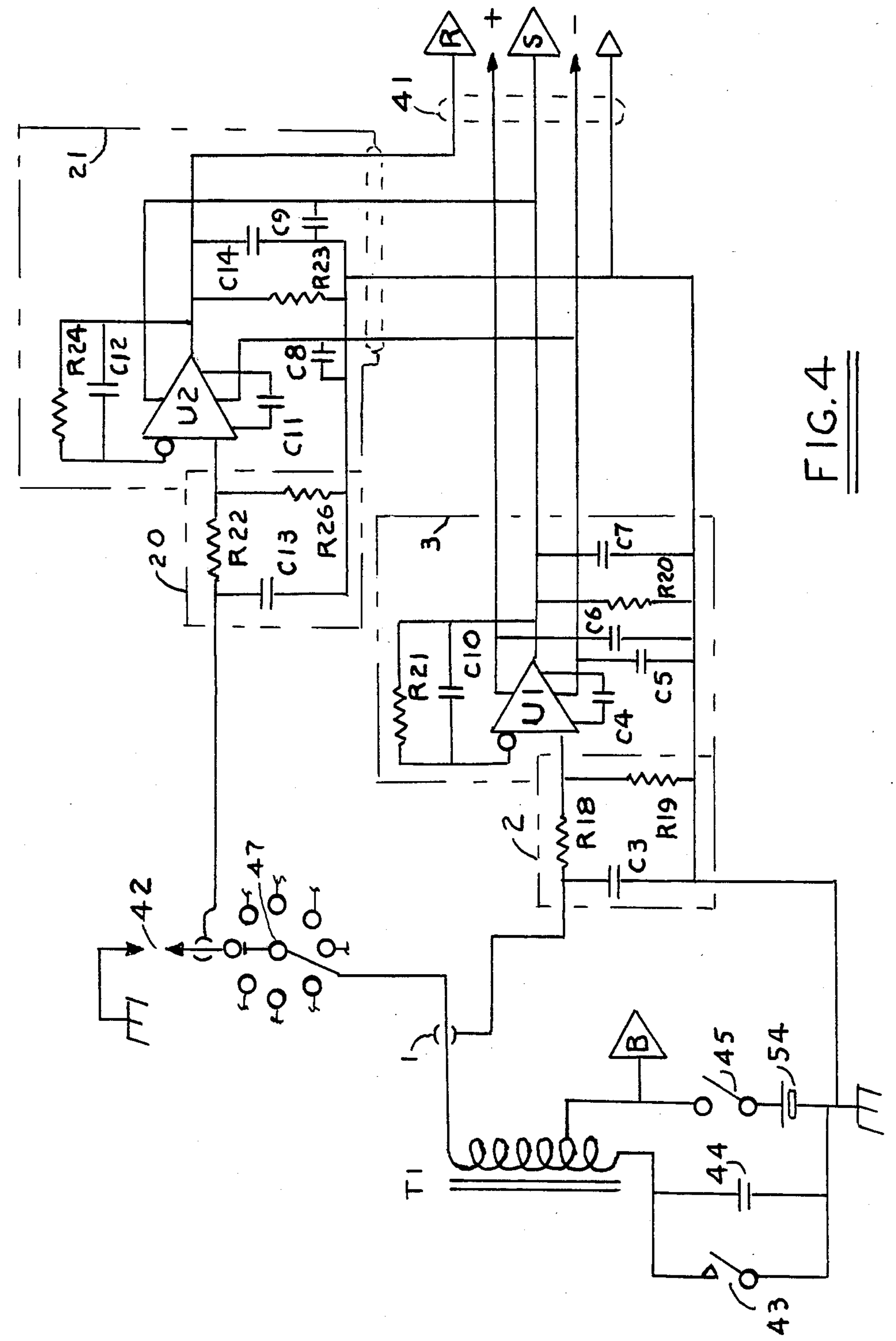
FIG. 4 is a schematic diagram of the sensing pickups.

FIG. 4 shows the interconnections for the actual sensor units. The lefthand side represents the components of the engine ignition system. T1 is the ignition coil or other source of high voltage. T1 is generally connected as an autotransformer arrangement as shown with a heavier wire on T1 lower current carrying portion. As it makes no difference to the analyzer what the source of high voltage is, it works the same for magneto or possible piezo electric elements. The high voltage source is the point being monitored. In the diagram, 43 is the ignition distributor breaker points and 44 the condenser across the points. 54 is the car battery and 45 the car ignition switch. The arrow B provides the source of power for the analyzer to FIG. 3 and is connected by a single wire. Item 47 is the ignition distributor and 42 a reference spark plug. The signal to be analyzed is picked up at the coil output by: 1, a capacitive clamp of less than 10 pF connected to a capacitive divider at C3 of 220 pF which is further attenuated by R18 at 10M ohms and R19. The combination of 1, C3, R18, and R19 provides a nondistorting attenuation not requiring a direct copper connection. This provides a signal in the range of 0–6 volts and is a faithfully scaled voltage in the area of interest which is the negative peak voltage shown at 48 in FIG. 5. The voltage follower U1 is a CA3130 FET input amplifier which faithfully drives the connecting line and its termination without signal distortion. This feature is the key to meaningful analysis of the spark signal. Components around U1 in the box 3 are as recommended in the CA3130 data sheets with the exception of R20 being changed to 4 k ohms which feeds a receiver of 4 k ohms in the analyzer. The elements in 2 forming a nondistorting attenuator and 3 forming a nondistorting high to low impedance translation. The elements in 20 and 21 are identical to the corresponding elements at 2 and 3. This was done to eliminate problems with inventory by having both units identical. However, the requirement for faithful signal is not as stringent on this unit as only a timing reference is needed. Item 19 is a capacitive clamp as for 1 except that it is coupled to a chosen reference sparkplug at 42. All systems tested had negative going initial ionizing voltage peaks. Should an engine system have positive peaks, this can be easily accommodated in the analyzer by altering the comparator inputs and references for opposite polarity detection. This peak polarity is controlled by the negative ground and the T1 coil winding arrangement. A single cable at 41 sends the detected signals to and receives regulated power from the analyzer. The pickups shown were plastic encapsulated in a 1.2-inch diameter by 2.3-inch tube. It may also be mounted in a metal shielded enclosure of similar shape but the shielding was found to be unnecessary. The 41 cable is shielded and the low level signal eliminates radio interference problems.

Figure 5:
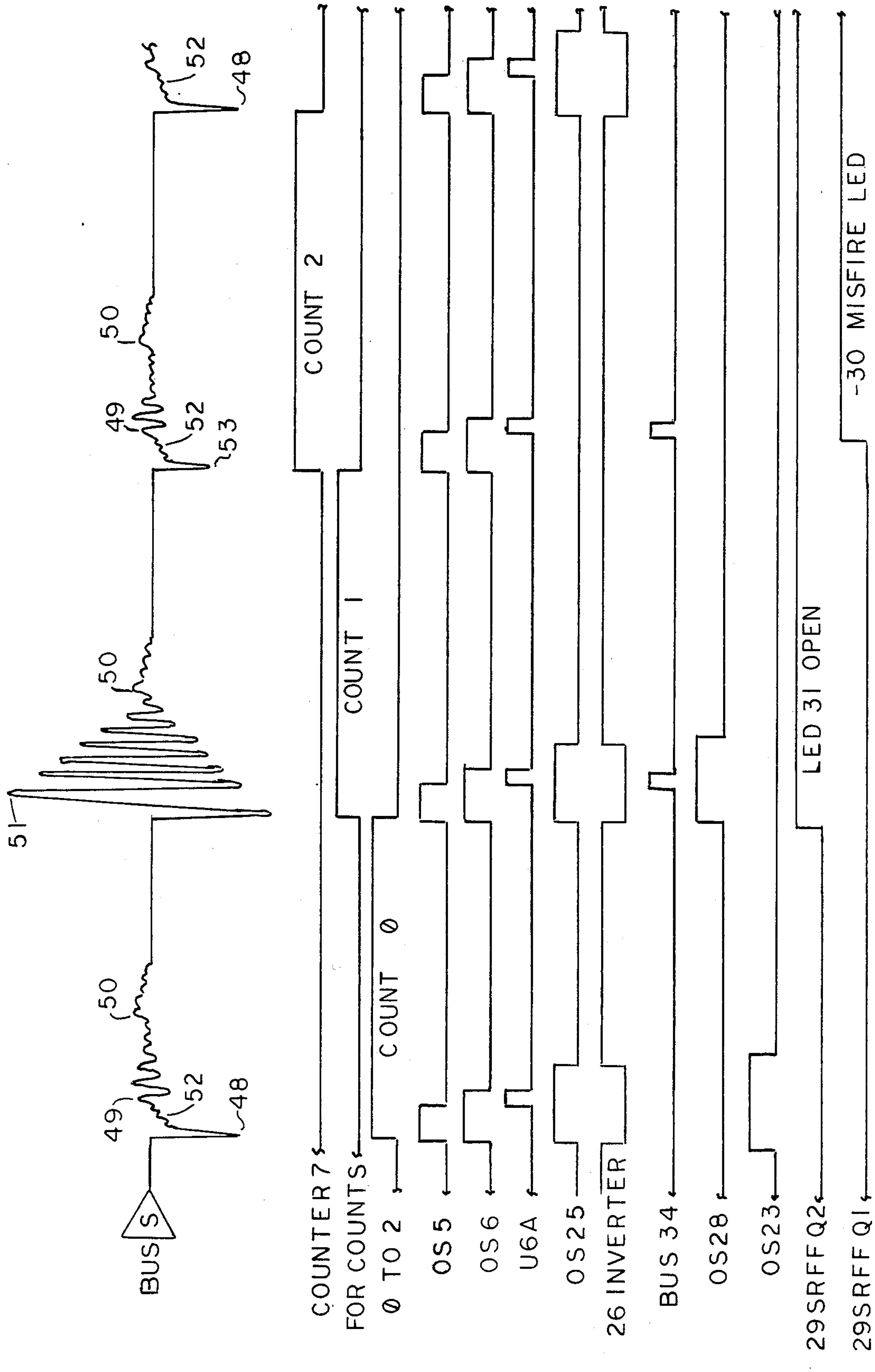
FIG. 5 is a waveform diagram showing signal and logic timing relationships on a relative scale.

Waveform representation of analyzer operation is shown in FIG. 5. The bus, arrow S, coming from the coil sensed signal has the waveform at 48 for a normal level sparking signal. The waveform at 51 represents the peak detected for nonionizing, lead off, signals. Peak 53 is detected for a shorted sparkplug. Ionization still occurs with this signal because of the small gap in the distributor. The duration of the ionized sparking or ignition is 52. Dissipation of energy of the coil while the points are open but the energy level not sufficient to maintain ionization is 49. The frequency of 49 is the same as the frequency for 51. It has been noted that this frequency is around 2 k Hertz for point condenser systems and around 5 k Hertz for a good transistor system. The initial coil charging waveform of the points closing is at 50. This portion of the waveform is not accurate due to the time constant of the capacitive DC coupling clamp at 1. The charging signal is actually around 1 k volt positive. This is of no interest for peak detection. OS 5 out clocks the counts to the counter 7 as shown; but OS 6 exclusively ORed at U6A out shows the delayed sampling event pulses at inverter 26. Bus 34 only outputs a fault pulse when these are detected by the logic previously described. This is shown by SR FF Q1 29 LED 30 Misfire light which remains on thereafter. The first pulse on bus 34 does not actuate the SR FF Q2 29 LED 31 open line as this is immediately set by OS 28 out. These bus 34 signals all control the light display, however, the logic senses these pulses and displays the count from bus 34 event to event when S3 Strobe is selected.

The major portion of the analyzer consists of all of the items described with the Advance and RPM portions deleted. This arrangement provides a very useful fault and location system of ignition problems. The means for producing these signals were previously described.

A less complete but useful device consists of only the fault detection portion. This signals a fault in the system but does not locate the fault. It may be used with engines of any number of cylinders and, in the case of a single cylinder, the fault location is automatically determined.

The spark advance system has many uses as an entity. This system comprises: means for producing ignition event signals. Said means may be the pickup shown at 1, 2, and 3. Because of only a timing requirement, the sensor may consist of only the attenuator portion of 1 and 2. Distortion of the signal will occur in transmission but an adequate timing point will be obtained. An alternate reference is for an appropriate scaled attenuator from the breaker points at 43 and coil. Means for producing signals representing crankshaft top dead center piston positions are unchanged from that previously described. Means responsive to said ignition event signals and said piston position signals comprise comparator 4 and comparator 15 as previously described for FIG. 2.

Means for indicating the spark advance angle for every ignition event are OS 16 and the voltmeter arrangement at M1, R16, R17 FIG. 3. Any wellknown method for determining duty cycle may be used as an indicator. The DC meter averaging arrangement is an appropriately simple method for a visual display. The variable on and off pulse arrangement may also be used as feedback signal for servo use of the actual spark advance position in an engine.

The arrangements described provide a low cost and very effective analyzers for monitoring ignition performance. They provide a much needed solution which enables users to detect and quickly repair problems which occur in any spark ignited system.

I claim:

1. An engine analyzer comprising: means for producing accurately scaled ignition signals from the high voltage ignition source;

means for producing signals representing crankshaft top dead center piston positions;

means for providing reference sparkplug signals;

individual comparator means responsive to said high voltage ignition source signals, said position signals and said plug signals for producing comparator output signals;

means responsive to said comparator signals for indicating abnormal ignition operation.

2. The device of claim 1, further comprising:

means for indicating the spark advance angle for every ignition event.

3. The device of claim 1, further comprising:

means for indicating individual sparkplug malfuncitons.

* * * * *